United States Patent
Melsa et al.

(10) Patent No.: US 7,130,415 B2
(45) Date of Patent: Oct. 31, 2006

(54) LINE DRIVER APPARATUS

(75) Inventors: Peter J. Melsa, Niles, MI (US); P. Sean Stetson, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 470 days.

(21) Appl. No.: 10/186,143

(22) Filed: Jun. 28, 2002

(65) Prior Publication Data
US 2004/0001586 A1 Jan. 1, 2004

(51) Int. Cl.
*H04M 19/00* (2006.01)

(52) U.S. Cl. .......................... 379/399.01; 379/387.01; 330/127

(58) Field of Classification Search ................ 379/398, 379/399, 399.01, 387.01; 330/297, 136, 330/261, 267, 273, 285, 296, 123, 127, 199; 326/30
See application file for complete search history.

(56) References Cited

U.S. PATENT DOCUMENTS

| | | | | |
|---|---|---|---|---|
| 3,317,898 A | * | 5/1967 | Hellerman | .................. 711/151 |
| 4,873,493 A | * | 10/1989 | Fujiwara | ...................... 330/285 |
| 5,929,702 A | * | 7/1999 | Myers et al. | ................ 330/136 |
| 6,028,486 A | * | 2/2000 | Andre | .......................... 330/297 |
| 6,323,733 B1 | * | 11/2001 | Gorcea et al. | ............... 330/297 |
| 6,373,277 B1 | * | 4/2002 | Felder | .......................... 326/30 |

* cited by examiner

*Primary Examiner*—Sinh Tran
*Assistant Examiner*—Walter F Briney, III
(74) *Attorney, Agent, or Firm*—Steven A. Shaw; W. James Brady; Frederick J. Telecky, Jr.

(57) ABSTRACT

A line driver apparatus includes a peak detector operable to receive a data signal and output a first logic signal when the data signal is below a threshold value and output one of a plurality of alternate logic signals when the data signal exceeds the threshold value. The peak detector includes a signal magnitude calculator operable to calculate an amount by which the data signal exceeds the threshold value. The line driver apparatus also includes an amplifier operable to receive a filtered analog data signal and one of a time-delayed first logic signal and one of a time-delayed alternate logic signal, wherein the amplifier operates at a first voltage level upon receiving the time-delayed first logic signal, and the amplifier operates at a voltage level that is increasing toward one of an alternate voltage level upon receiving the time-delayed second logic signal.

19 Claims, 3 Drawing Sheets

LINE DRIVER APPARATUS

RELATED APPLICATIONS

The present application is related to U.S. application Ser. No. 09/997,527 entitled "A Programmable Peak Detector for Use with Zero-Overhead Class G Line Drivers" (Attorney Docket No. TI-33111).

TECHNICAL FIELD OF THE INVENTION

This invention relates generally to electronic circuits, and more specifically to a line driver apparatus.

BACKGROUND OF THE INVENTION

The amplification and line driving of data signals for transmission, such as for use in digital subscriber lines (DSL), constitutes an important link in the transmission of data signals. The transmitted data signals will probably have a substantially Gaussian distribution: a given percentage of symbols constituting the data signals will have an amplitude below a certain amount, and the rest will have an amplitude above that certain amount. When amplifying these symbols for transmission by a line driver, one has typically set the power supply rail of the line driver amplifier at a large voltage level so that there is a low probability of clipping. However, the large voltage level is still high enough to lead to excessive power consumption, because much of the time the line driver will not be amplifying a signal requiring the large voltage level.

One attempted solution to this problem is the creation and employment of a Class G amplifier. A Class G amplifier may generally be defined as an amplifier, which has associated with it two sub-amplifiers with different operating voltages. In one prior-art embodiment, the Class G amplifier employs two sub-amplifiers coupled in parallel, in which the Class G amplifier's analog circuitry decides which sub-amplifier to use to amplify the data signal. The decision is based upon the amplitude of the data signal, thereby hopefully leading to a power savings while minimizing the odds of clipping data signals.

While prior art zero overhead Class G amplifiers generally provide improved performance, their performance still involves the possibility of clipping the data signal (because the low operating voltage sub-amplifier is used when the incoming signal is above the threshold) or consuming excessive power (because the high operating voltage sub-amplifier is used when the incoming signal is below the threshold). These inefficiencies can arise because of an inherent inaccuracy in making the threshold determination after the incoming signal has been converted to analog domain and also from the fact that the signal may be distorted by analog filters subsequent to the threshold determination.

For instance, filters may have associated with them a phenomenon known as "group delay distortion". In group delay distortion, different frequencies traversing a set of filters may have different propagation constants due to characteristics associated with the filters. As the various sinusoidal signals are delayed, they may constructively or destructively interfere, yielding an output signal different from the input signal. Constructive interference may cause the zero-overhead amplifier to clip a data signal, as the sub-amplifier was configured for signal data with a lower amplitude. Alternatively, destructive interference may cause the zero-overhead amplifier to waste power, as the sub-amplifier may be needlessly coupled to a rail to accommodate a now-attenuated data signal. These and other problems lead to difficulties in determining the correct triggering threshold for the peak detector circuit when making the determination of the triggering threshold in the digital domain.

Therefore what is needed in the art is a zero-overhead amplifier that overcomes the above-described and other limitations of the prior art.

SUMMARY OF THE INVENTION

From the foregoing, it may be appreciated by those skilled in the art that a need has arisen for a power efficient system for preventing signal clipping. In accordance with the present invention, a line driver apparatus is provided that substantially eliminates or greatly reduces disadvantages and problems associated with prior signal amplifier systems.

According to an embodiment of the present invention, there is provided a line driver that includes a peak detector. The peak detector includes a signal magnitude calculator and a logic delay and is operable to receive a data signal and output a first logic signal when the data signal is below a threshold value and output a second logic signal when the data signal exceeds the threshold value. The signal magnitude calculator is operable to calculate an amount by which the data signal exceeds the threshold value. The logic delay is operable to receive one of the first logic signal and second logic signal and output one of a time-delayed first logic signal and a time-delayed second logic signal. The line driver also includes a data signal delay that is operable to receive the data signal and output a time-delayed data signal. The line driver also includes a digital-to-analog converter operable to receive the time-delayed data signal and output an analog data signal. The line driver further includes a filter operable to receive the analog data signal and output a filtered analog signal to an amplifier. The amplifier is operable to receive the filtered analog data signal and one of the time-delayed first logic signal and time-delayed second logic signal, wherein the amplifier operates at a first voltage level upon receiving the time-delayed first logic signal, and the amplifier operates at a voltage level that is increasing toward a second voltage level upon receiving the time-delayed second logic signal.

The present invention provides various technical advantages over a prior line driver apparatus. For example, one technical advantage is to provide a system operable to detect the amount by which a data signal exceeds a threshold value. Another technical advantage is to provide a plurality of voltage sources in addition to a threshold voltage source, the plurality of voltage sources providing a power efficient way to prevent signal clipping. Other technical advantages may be readily ascertainable by those skilled in the art from the following figures, description, and claims.

BRIEF DESCRIPTIONS OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Details regarding one embodiment of a "zero-overhead" Class G amplifier ("zero-overhead line driver") are provided in a related application titled "Zero-Overhead Class G Line Driver with Threshold Detection", Ser. No. 10/001,330 and filed on Nov. 11, 2001, which is hereby incorporated by reference in its entirety. By "zero overhead," it is meant that the amount of pad or tolerance that must be built into the threshold value (in order to ensure the incoming signal is not clipped and that the amplifier does not consume excess power) is minimized by setting the threshold as closely as possible to the theoretical threshold (disregarding measurement inaccuracies, filter distortion, and the like). A zero overhead Class G line driver makes the threshold determination on the incoming signal while the signal is still in the digital domain, thus improving the accuracy of the determination. Additionally, rather than switch between a first or second sub-amplifier, in one embodiment the zero overhead line driver employs a single output amplifier with multiple power supplies of distinct voltages. The zero-overhead line driver also employs a peak detector circuit to determine which of the power supplies are to be connected to the supply rail of the output amplifier, and then dynamically switches the output amplifier from one power supply to another power supply. This determination is generally based upon the amplitude of the input data signal: i.e., if the input data signal is above or below a given threshold. The selected power supply is then applied to the supply rail of the amplifier.

Even when the incoming signal peaks can be accurately detected, inaccuracy and inefficiency of the system can still arise because of the distortions introduced by the filters of the system, as discussed above. These inaccuracies can be compensated for, and/or their effects minimized, as described in the following embodiments of the present invention.

Figures 1, 2A:
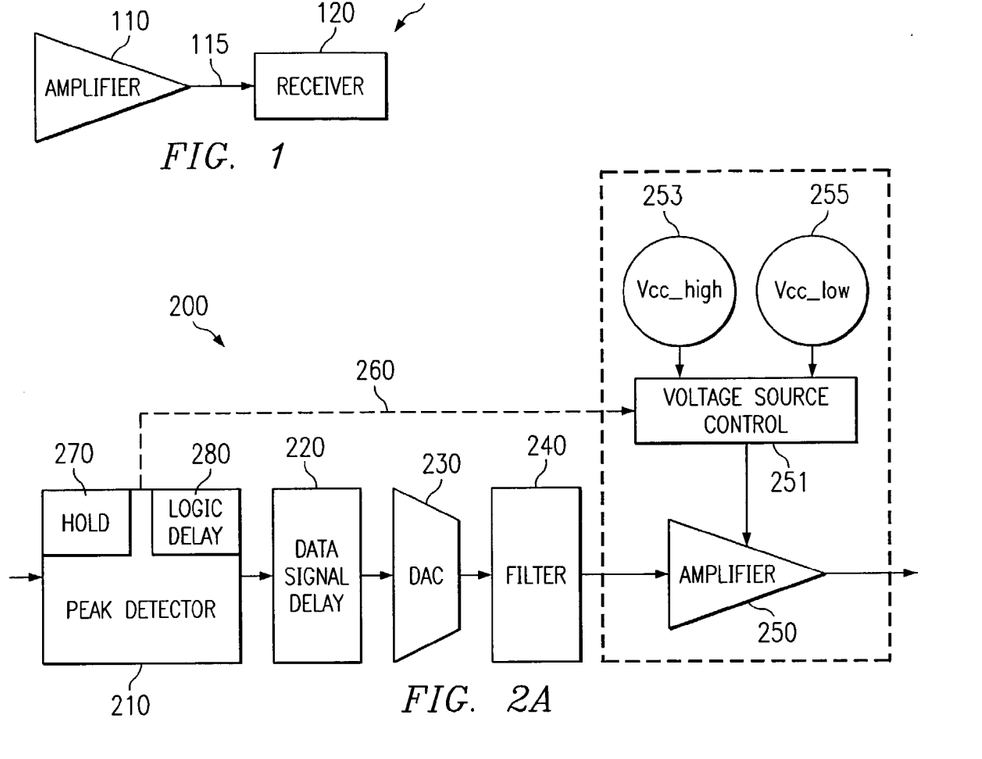
FIG. 1 illustrates one embodiment of a high-level system employing a zero-overhead Class G amplifier for xDSL modems.
FIG. 2A illustrates another embodiment of a zero-overhead Class G line driver.

FIG. 1 illustrates one embodiment of a high-level system employing a zero-overhead Class G line driver for, e.g. xDSL modems. In one embodiment, the xDSL system 100 has a zero-overhead Class G line driver 110, a data transmission line 115, and a receiver 120. The zero-overhead Class G line driver 110 dynamically switches among one of a plurality of high voltage sources. A given switched high voltage source is associated with the maximum output voltage of the zero-overhead Class G line driver 110 for any given analog output signal. The analog output signal is then transmitted through the data transmission line 115, to be received by the receiver 120. The present invention may be used anywhere where a Class G amplifier may be used when the data signal starts in the digital domain. Applications of the Class G amplifier include, but are not limited to, audio, video, telecommunications, and various power applications.

FIG. 2A illustrates another embodiment of a zero-overhead Class G line driver employing a programmable peak detector. A zero-overhead Class G line driver 200 ("line driver 200") receives a digital input signal into a peak detector 210. The peak detector 210 compares the digital input signal to a threshold value in order to determine whether or not to assert a first logic signal (e.g. a logic "high" signal), as will be described in greater detail, below. Otherwise, a second logic signal (e.g., a logic "low" signal) will be asserted by the peak detector 210. The first and second logic signals configure an amplifier 250 when transmitted through a control line 260, in a manner to be explained below.

The peak detector 210 also transmits the digital input signal to the data signal delay 220. The data signal delay 220 then delays the digital input signal for a programmed number of data samples, for reasons as will be described in greater detail below. The data signal delay 220 then transmits the delayed digital input signal to a digital-to-analog converter (DAC) 230, wherein the digital input signal is converted into an analog signal. Every digital input signal sample received by the DAC 230 has associated with it a "low" signal or a "high" signal on control line 260, as will be detailed below.

From the DAC 230, the analog signal is then filtered by a filter 240. The filter 240 may be a plurality of filters. The filter 240 may introduce potential distortions into the filtered analog signal, such as group delay distortion and passband ripple. Filter 240 also introduces some delay into the signal path. In the presently contemplated embodiment, this delay will be on the order of approximately one sample (or roughly 0.06 μs at a typically sampling rate of 17.664 MHz). This potentially distorted filtered analog signal is then transmitted to the amplifier 250.

The supply rail of the amplifier 250 is dynamically switched to one of a plurality of separate voltage sources of differing voltages, referred to as a Vcc_high 253 and a Vcc_low 255, by a voltage source control 251, as a function of signals received through the control line 260. There is a "switching time" associated with the dynamic switching of one voltage source to a second voltage source by the voltage source control 251. The switching time may generally be defined as the time allotted by the line driver 200 for the amplifier 250 to completely transfer from a first voltage source to a second voltage source and ensure the sole utilization of the second voltage source by the amplifier 250. Otherwise, after a dynamic switch is initiated, but before the complete switching time has elapsed, the amplifier 250 may operate in an intermediate status wherein the functionality of the amplifier 250 is an intermediate state between the first voltage source and the second voltage source. In this embodiment, the switching time will typically be in the range of 9 samples, or roughly 0.5 μs. This is roughly an order of magnitude greater than the filter delay. In other embodiments, the switching time may be roughly equivalent to, or in some cases, less than the filter delay. As will be discussed in greater detail below, the switching time can be compensated for by a time delay factor introduced by the data signal delay 220. The time delay factor may also be programmable, as the real-world switching speed the amplifier 250 may differ from its theoretical switching speed.

To restate the above, the voltage source, either Vcc_high 253 or Vcc_low 255, is chosen by the voltage source control 251 based upon the signal received from the peak detector 210. The selected voltage source is then applied to the supply rail of the amplifier 250. To discuss the above in more detail, the peak detector 210 uses a comparator, versus a threshold value, to determine whether the amplifier 250 should use a higher voltage source (Vcc_high 253) for its voltage supply rail, or whether the amplifier 250 should use a lower voltage source (Vcc_low 255) for its voltage supply rail to amplify any given portion of the analog signal. The choice by the peak detector 210 of the Vcc_high 253 or Vcc_low 255 voltage supply for employment by the amplifier 250 determines both the output characteristics of the amplifier 250 and the power consumption of the line driver 200. If the Vcc_high 253 voltage source is used, the analog output signal should not be clipped, but the line driver 200 would be using more power. If the Vcc_low 255 voltage source is used, the amplifier 200 would be using less power, but there is a possibility that the analog output signal may be clipped.

As mentioned above, the filter 240 introduces some ambiguity into the amplitude of the intermediate signal, as the filter 240 may introduce potential distortions, such as group delay distortion and passband ripple. This distortion can vary over time due to component tolerances and changes due to such factors as temperature, of the line driver 200 and other environmental factors.

Setting an exact threshold value for the peak detector 210 to maximize power conservation efficiency while ensuring no clipping is not practical. Therefore, in one embodiment, the threshold value of the peak detector 210 is lowered to compensate for any potential clipping. The amount by which the threshold value is lowered to compensate for the potential of clipping is called the overhead value of the peak detector 210. The peak detector 210 employs an overhead value to partly compensate for uncertainty in peak determination when setting the threshold. To elaborate, if the filter 240 was not interposed between the peak detector 210 and the amplifier 250, the overhead value could be zero. However, as the filter 240 introduces ambiguity into the filtered analog signal, there is a potential of a clip, and when there is a potential of a clip, there is a potential that the clipped analog output signal will cause bit errors at the receiver. Given that peak detection by the peak detector 210 is implemented prior to the DAC 230, it is impossible to know exactly when peaks at the input of the amplifier 250 will occur.

In particular, due to the ambiguity introduced by the filter 240, the peak detector 210 may locate a peak pre-DAC 230 that does not occur post-filter 240 and vice versa. This has two impacts. First, peaks that are missed may end up being amplified by the amplifier 250 using the lower voltage source, and thus clip. Second, small signals may be amplified by the amplifier 250 using the higher voltage source unnecessarily. The former may cause bit errors. The latter leads to higher power consumption. Note, however, that the switching time of the amplifier 250 also occasionally advantageously masks detection errors. If the peak detector 210 misses a peak entirely, there is a possibility of still not clipping the output analog signal. Specifically, if the amplifier 250 is at some intermediate voltage from switching between two different voltage sources, there is some chance that the peak will not be clipped, and that the amplifier 250 can transmit without clipping.

As discussed above, to help minimize the probability of clipping, the peak detector 210 reduces the threshold by an overhead value. This reduces the probability of clipping at the expense of power consumption. The overhead value represents a trade-off between power efficiency of the line driver 200 and the probability of clipping the analog output signal. In an ideal system in which no signal distortion is introduced between the peak detector and the input to the amplifier, the threshold value would be set at a value such that the ratio of the threshold to the average value (rms) of the input to the peak detector 210 (and hence the amplifier 250) is equal to the ratio of the peak output (at the lower VCC supply rail) to the average value (rms) of the output from the amplifier 250. In real-world applications, however, the ratio must compensate for the distortion that will arise between the input to the peak detector and the input to the amplifier. The overhead value accomplishes this.

The overhead value may be defined in dB relative to the peak-to-average ratio, and the threshold value employed by the peak detector 210 is in turn a function of the overhead value, i.e.

$$threshold = 10^{[(20*log10(VCClow\_peak/tr\_rms) - overhead)/20]} * pd\_rms$$

where Vcc_low peak is the peak voltage at Tip/Ring that can be supported using Vcc_low 255 voltage source as the supply voltage for the amplifier 250, tr_rms is the rms voltage at Tip/Ring, and pd_rms is the rms voltage seen by the peak detector 210. The final determination of the required overhead itself will depend upon the BER requirements of the given system 100. More specifically, the overhead may typically be dependent on the characteristics of the filters 240, and then determined in order to obtain an acceptable BER. The overhead value may be pre-programmed using the above or similar calculations into the peak detector 210, or the overhead value may be calculated and programmed by the line driver 200 itself as measured characteristics of the system 100 changes.

The peak detector 210 also has associated with it a hold element 270, that may be integrated into the peak detector 210, as shown in FIG. 2A. This hold element 270 ensures that the logical high signal is applied on control line 260 for at least the minimum amount of time required for the amplifier 250 to completely make the switchover from the Vcc_low 255 voltage source to the Vcc_high 253 voltage source when the peak detector 210 generates the first logic signal, i.e. the switching time. Once triggered, the hold element therefore maintains the first logic signal for a given amount of time to the voltage source control 251, ensuring the amplifier 250 has time to make the switchover from the Vcc_low 255 voltage source to the Vcc_high 253 voltage source and stays at Vcc_high 253 while the peak is received. Once the hold element is no longer maintaining the first logic signal, the voltage source control 251, and hence the amplifier 250, then may begin to switch back to employing the Vcc_low 255 voltage source, once the amplifier 250 is no longer receiving the fist logic signal. In other embodiments, the amplifier will stay at Vcc_high 253 until the voltage source control 251 receives the second logic signal from the peak detector 210.

The peak detector 210 also has associated with it a logic signal delay element 280, that may also be integrated into the peak detector 210. In some embodiments, the delay introduced by filter 240 might exceed the switching time. Under those circumstances, the logic signal on control line 260 must be delayed for some period of time after the threshold value is crossed, as detected by peak detector 210. The logic signal delay element 280 ensures that, if the natural delay caused by the filter 240 is longer than the switching time of the amplifier 250, the first logic signal would be delayed by the time equal to the difference between the natural delay of the filter 240 and the switching speed of the amplifier 250 (or, more accurately, of the voltage source control 251). The above-discussed data signal delay 220 would be set to zero under these circumstances.

Conversely, if the natural delay of the filter 240 is shorter than the switching speed of the amplifier 250 (the expected case), the logic signal delay element would be set to have zero time delay, but the data signal delay 220 would delay the digital input signal by a time equal to the difference between the natural delay of the filter 240 and the switching speed of the amplifier 250.

Disclosed is an algorithm which demonstrates the relationship between the various programmable parameters, such as used within the data signal delay 220, the logic signal delay element, and the hold element. The following is a list of parameters and their description:

| | |
|---|---|
| D | "bulk delay" through the filter 240 |
| var | variability in D due to various component tolerances and overall changes in the filter 240 |
| S | the switching time of the amplifier 250 |
| N | the delay time of the data signal delay 220 |
| Delay | delay in asserting a first logic signal by the logic signal delay element |
| Hold | length of time the first logic signal is applied by the hold element |
| Threshold | value used by the peak detector 210 |

Figure 2B:
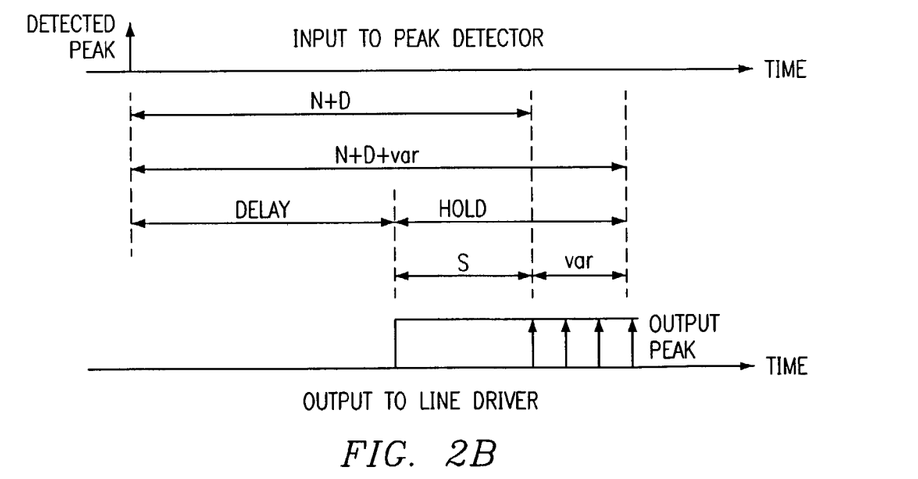
FIG. 2B illustrates a timing diagram of relationships between various parameters of the zero-overhead Class G line driver.

The relationship between all of the above parameters is illustrated in FIG. 2B. In all cases, the parameters are chosen such that an adequate amplifier 250 switching time is allowed just before the peak of the filtered analog signal reaches the amplifier 250, i.e., N+D samples after being detected. To restate the above, the threshold value is the digital value against which the peak detector 210 compares the absolute value of the incoming digital input signal. Assuming D<S, only N or Delay need to be configurable or programmable. Since all of the above parameters have an impact upon power consumption, it will be desirable to fine-tune these parameters. To facilitate this N (or Delay), Threshold and Hold may be software configurable parameters. Alternatively, any parameter may be a software configurable parameter.

```
If D < S (expected case)
    if N is variable (i.e., Delay is the unused parameter)
        N = S − D
        Delay = 0
    if N is fixed (i.e. N is the unused parameter)
        Delay + N + D − S
    else (included for completeness)
        N = 0
        Delay = D − S
        Hold = S + Var
```

Figure 3:
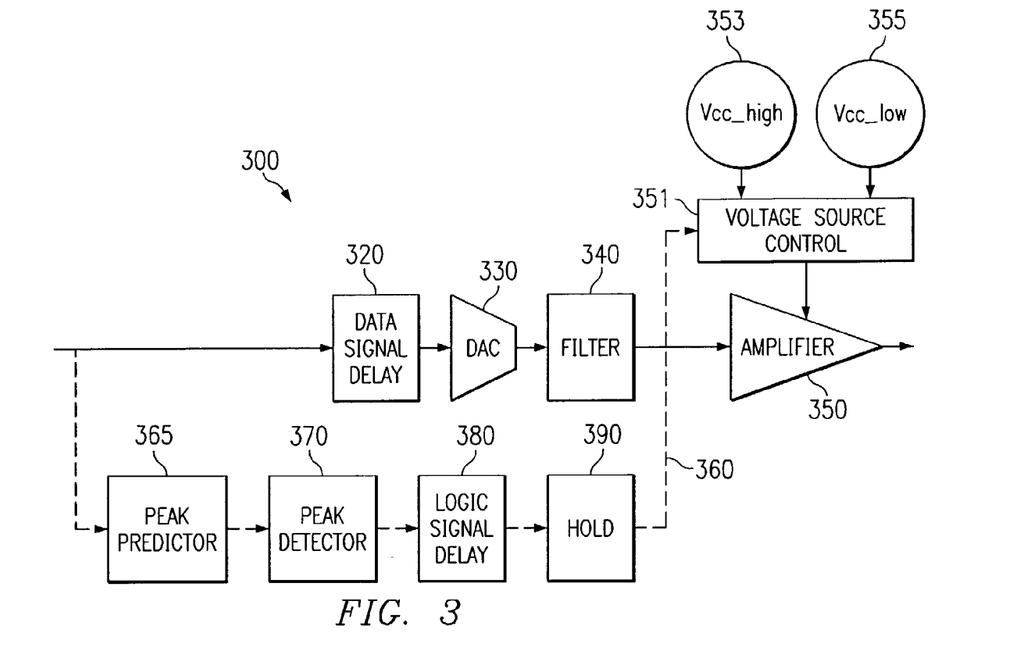
FIG. 3 illustrates another embodiment of a zero-overhead Class G line driver.

Turning now to FIG. 3, disclosed is an alternative embodiment of a zero-overhead Class G line driver employing a programmable peak detector. A zero-overhead Class G line driver 300 ("line driver 300") has a data signal delay 320, a DAC 330, a filter 340, an amplifier 350, a voltage source control 351, a Vcc_high 353 voltage source, a Vcc_low 355 voltage source, and a control line 360, which operate in an analogous manner to the line driver 200.

However, the alternative embodiment of the amplifier 300 has an added peak predictor 365, as will be described in more detail, below. Also, a logic signal delay 380 and a hold 390 have been extracted from the functionality of a peak detector 370, as will also be described in more detail, below.

As there may be distortion to the filtered analog signal introduced by the filter 340, it would be useful to be able to try to predict the behavior of the filter 340. The peak predictor 365 analyzes the digital input signal, and then transforms it into an intermediate control signal. The intermediate control signal should ideally emulate the behavior of the filter 340 upon the analog signal, i.e. it should model the distortion imposed by filter 340 and should introduce a similar distortion onto the intermediate signal at its output. The intermediate control signal is in turn transmitted to and acted upon by the peak detector 370. The peak detector 370 then compares the intermediate control signal to a threshold value, to determine whether or not to assert a first logic signal. In an analogous manner to the peak detector 210, the peak detector 370 also employs an overhead value to modify the threshold value.

As the peak predictor 365 has made an approximation of the behavior of the analog signal as it traverses the filter 340, it may be possible to decrease the overhead value implemented within the peak detector 370, and therefore raise the threshold value necessary to achieve an acceptable BER. Raising the threshold of the peak detector 370 would reduce power consumption, as the amplifier 350 would switch less often to the Vcc_high 353 voltage source, thereby consuming less power.

In the line driver 300, logic signal delay 380 and the hold 390 may be implemented separately from the peak detector 370. The voltage source control 351 operates in an analogous manner to the voltage source control 251, and therefore shall not be described in further detail of FIG. 3. Likewise, the logic signal delay 380 and the hold 390 operate in an analogous manner to the high assertion signal delay element and the hold element, respectively, of the peak detector 210 and therefore shall not be described in further detail within the description of FIG. 3. Alternatively, the logic signal delay 380 and the hold 390 could both be implemented within the peak detector 370.

Figure 4:
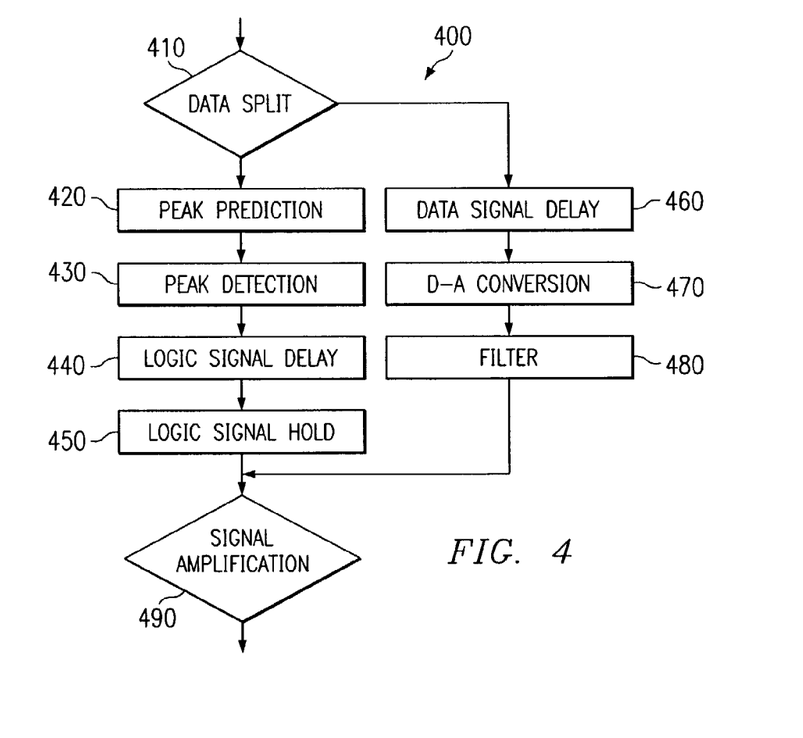
FIG. 4 illustrates a method of use of the zero-overhead Class G line driver employing a programmable peak detector.

Turning now to FIG. 4, disclosed is a method for use of the zero-overhead Class G line driver 400. The digital input signal is first split by a signal split 410. After the step signal split 410, the digital input signal is processed by a peak prediction step 420. Also, the digital input signal is processed by a data signal delay 460.

In peak prediction step 420, the digital input signal is analyzed to predict behavior of the analog signal when it is processed in a filtering step 480. The peak prediction step 420 creates an intermediate control signal, which is employed by in the peak detection step 430.

The peak detection step 430 uses the intermediate control signal, and compares the threshold value to this intermediate control signal to determine whether or not to generate the first logical signal for the amplifier. The threshold value has been modified by the overhead value, as described above.

After the peak detection step 430, a logic signal delay step 440 may delay the first logical signal for a programmed amount of time, as discussed above with reference to FIGS. 2A and 3. After the logic signal delay step 440, a logic signal hold step 450 is executed. The logic signal hold step 450 allows the voltage source control to apply the Vcc_high voltage source for a programmed amount of time when the method 400 executes the amplification step 490.

In the data signal delay step 460, the digital input signal is delayed by a programmed amount of time, as described above. After executing the data signal delay step 460, the method 400 then executes a digital to analog conversion of the digital data input in a D-A conversion step 470, and transforms the digital input signal into an analog signal.

The analog signal is then filtered in a filtering step 480 to create a filtered analog signal. As detailed above, the filtering of the filtering step 480 may introduce distortions into the analog signal, such as group delay, passband ripple, and so on. Peak predictor step 420 and the peak detector step 430 attempt to compensate for this ambiguity.

Finally, the filtered analog signal is amplified in the amplification step 490. The switched high supply voltage connected in the amplification step 490 is a function of the first logic signal, or lack thereof, applied by the peak detector step 430. Alternatively, the high supply voltage is a function of which of the two logic signals, e.g., high or low, is received. The configuration and employment of the amplifier of the amplification step 490 has been detailed above, and will therefore not be described in further detail. Finally, the amplification step 490 produces a final output signal for transmission to a receiver.

Figure 5:
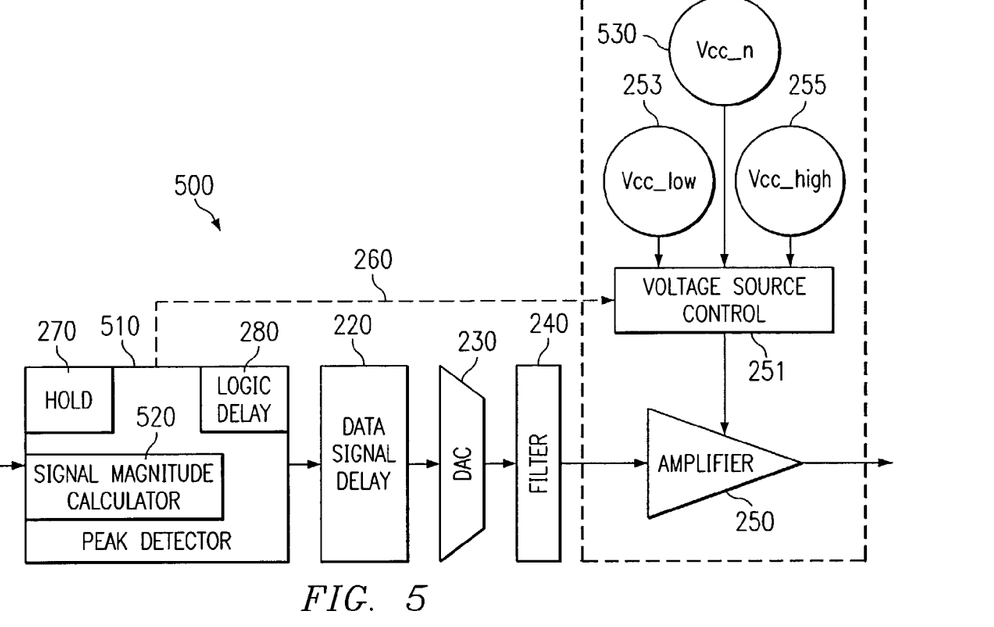
FIG. 5 illustrates yet another embodiment of a zero-overhead Class G line driver.

FIG. 5 shows a line driver 500 in one embodiment of the present invention. In the illustrated embodiment, line driver 500 includes a peak detector 510, data signal delay 220, DAC 230, filter 240, amplifier 250, and voltage source control 251. Data signal delay 220, DAC 230, filter 240, and amplifier 250 operate in a substantially similar manner as has been previously described with regard to FIG. 2A. The embodiment of the present invention illustrated in FIG. 5 and described below in greater detail includes at least three voltage sources and a signal magnitude calculator 520.

In one embodiment, peak detector 510 includes hold element 270, logic delay 280, and signal magnitude calculator 520. Hold element 270 and logic delay 280 operate in a similar manner as has been previously described with regard to FIG. 2A. Signal magnitude calculator 520 compares a digital input signal received by peak detector 510 with the threshold value. Signal magnitude calculator 520 measures the magnitude of the digital signal input that exceeds the threshold value.

In one embodiment, voltage source control 251 is operable to receive power from a plurality of voltage sources. In the illustrated embodiment, the plurality of voltage sources are Vcc_low 253, Vcc_n 530, and Vcc_high 255. Other embodiments of the present invention are envisioned that include two, three, or any greater number of voltage sources. Vcc_low 253 and Vcc_high 255 are operable to supply a voltage in a similar manner as has been previously described with regard to FIG. 2A. Voltage source Vcc_low 253 is operable to provide power to amplifier 252 at a voltage level sufficient to amplify a signal at or below the threshold level. Voltage source Vcc_low 253 is operable to provide power to amplifier 252 at a voltage level sufficient to amplify a signal above the threshold level if the overhead value is non-zero, but such signals will typically be amplified using Vcc_high 255. Voltage source Vcc_high 255 provides power to amplifier 250 at a voltage level greater than that of voltage source Vcc_low 253. Voltage source Vcc_n 530 is operable to supply power to amplifier 250 through voltage source control 251 at a voltage level between Vcc_low 253 and Vcc_high 255. In one embodiment, voltage source Vcc_n 530 supplies power at a voltage level half-way between the levels of Vcc_low and Vcc_high.

The operation of line driver 500 will now be considered in greater detail. Line driver 500 receives a digital input signal into peak detector 510. Peak detector 510 compares the digital input signal to a threshold value. Signal magnitude calculator 520 measures any amount by which the digital input signal exceeds the threshold value. Peak detector 510 transmits the digital input signal to data signal delay 220. The path of the digital input signal through data signal delay 200, DAC 23, filter 240, and amplifier 250 is the same as has been described with respect to FIG. 2A.

During normal operating conditions, when the digital input signal is below the threshold value, amplifier 250 is powered by voltage source Vcc_low 253. Peak detector 510 issues a first logic signal to command voltage source control 251 to provide power from Vcc_low 253 to amplifier 250. The power supplied by Vcc_low 253 is sufficient for digital input signals that do not exceed the threshold value. If the digital input signal exceeds the threshold value, however, amplifier 250 will require a higher voltage level than is provided by Vcc_low 253. The voltage source of amplifier 250 may be dynamically switched to one of a plurality of separate voltage sources of differing voltages. In the illustrated embodiment, the separate voltage sources are Vcc_n 530 and Vcc_high 255.

Signal magnitude calculator 520 is operable to measure the amount by which a digital input signal exceeds the threshold value. Upon detecting a digital input signal exceeding the threshold value that is less than the voltage level of voltage source Vcc_n 530, peak detector 510 sends a second logic signal on control line 260 to command voltage source control 251 to switch to voltage source Vcc_n 530. If a digital input signal exceeds the threshold value and exceeds the voltage level of voltage source Vcc_n 530, peak detector 510 sends a third logic signal on control line 260 to command voltage source control 251 to switch to voltage source Vcc_high 255. In other embodiments, peak detector 510 is able to switch to any other provided voltage source by communicating on control line 260 a logic signal associated with the voltage source.

In the illustrated embodiment, the dynamic power consumption of line driver 500 is kept low by providing a voltage level other than Vcc_low only for the minimal time period necessary to maintain clipping protection for the digital input signal. When peak detector 510 determines that a digital input signal exceeds the threshold value, signal magnitude calculator 520 measures the amount by which the digital input signal exceeds the threshold value. The amount measured by signal magnitude calculator 520 indicates the minimum voltage level increase that must be supplied to amplifier 250 to prevent a clipping of the digital input signal. Peak detector 510 first determines whether the data signal input is greater or less than the voltage level of voltage source Vcc_n 530. Where the digital signal input exceeds the threshold value but is below Vcc_n, peak detector 510 will use voltage source Vcc_n 530 to prevent a clipping of the digital signal input. Where the digital signal input exceeds the threshold value and Vcc_n, peak detector 510 will use voltage source Vcc_high 255 to prevent a clipping of the digital input signal.

Not all digital input signals that exceed the threshold value will immediately require the full voltage level of voltage sources Vcc_n 530 or Vcc_high 255 to prevent signal clipping, however. Supplying the additional voltage for a longer period of time than is necessary needlessly increases the power consumption of peak detector 510. In one embodiment of the present invention, when peak detector 510 determines that voltage source control 251 must be switched from voltage source Vcc_low 253 to either of voltage sources Vcc_n 530 or Vcc_high 255, peak detector 510 is operable to consider the switching time of amplifier 250, discussed above with regard to FIG. 2A. The switching time of amplifier 250 is used by peak detector 510 to determine at what time either the second logic signal for voltage source Vcc_n 530 or the third logic signal for voltage source Vcc_high 255 should be issued.

For example when digital input signal exceeds the threshold value but is less than Vcc_n, it may not be necessary to immediately command voltage source control 251 to begin the switch from voltage source Vcc_low 253 to voltage source Vcc_n 530. When voltage source control 251 switches to voltage source Vcc_n 530, the voltage level of amplifier 250 begins to increase from the voltage level of Vcc_low to the voltage level of Vcc_n. The time required to complete this transition is the switching time of amplifier 250. Peak detector 510 uses the value measured by signal magnitude calculator 520 to determine the switching time required to increase the voltage level of amplifier 250 from Vcc_low to a voltage level above the digital input signal so that no signal clipping occurs. Knowing the switching time required, peak detector 510 may then calculate a time delay for when the voltage increase of amplifier 250 must begin. Peak detector 510 issues the second logic signal on control line 260 after the time delay elapses.

The time delay is selected by peak detector 510 so that the voltage level of amplifier 250 will not necessarily have reached Vcc_n but is sufficient to prevent any clipping of the digital input signal. As soon as the peak of the digital input signal passes through amplifier 250, peak detector 510 sends the first logic signal across control line 260 to voltage source control 251, instructing voltage source control 251 to switch amplifier 250 back to voltage supply Vcc_low 253. For digital input signals at or near the voltage level of Vcc_n, the time delay prior to sending the second logic signal may be very short or even zero. Implementing the time delay reduces the time duration for which voltage source Vcc_n 530 is used, which reduces the overall power consumption of line driver 500. Logic signal delay element 280 is also used to implement this time delay in order to reduce overall line driver 500 power consumption. In response to the width and height of the portion of the digital input signal above the threshold value measured by signal magnitude calculator 520, logic signal delay element 280 determines when the appropriate control signal is to be applied on control line 260.

Unwanted clipping of digital input signals that exceed both the threshold value and Vcc_n is prevented by switching from voltage source Vcc_low 253 to voltage source Vcc_high 255. Peak detector 510 commands voltage source control 251 to switch to voltage source Vcc_high 255 only for the time necessary to increase the voltage level of amplifier 250 sufficiently to prevent the clipping of the digital input signal. For digital input signals that are at or near the voltage level of Vcc_high, a time delay prior to issuing the third logic signal may be very short or even zero.

In another embodiment of the present invention, voltage source Vcc_high 255 is used for all digital input signals in excess of the threshold level. The time delays for issuing the second and third logic signals may be calculated by peak detector 510, or they may be retrieved by peak detector 510 via a lookup table stored in a memory.

Figure 6:
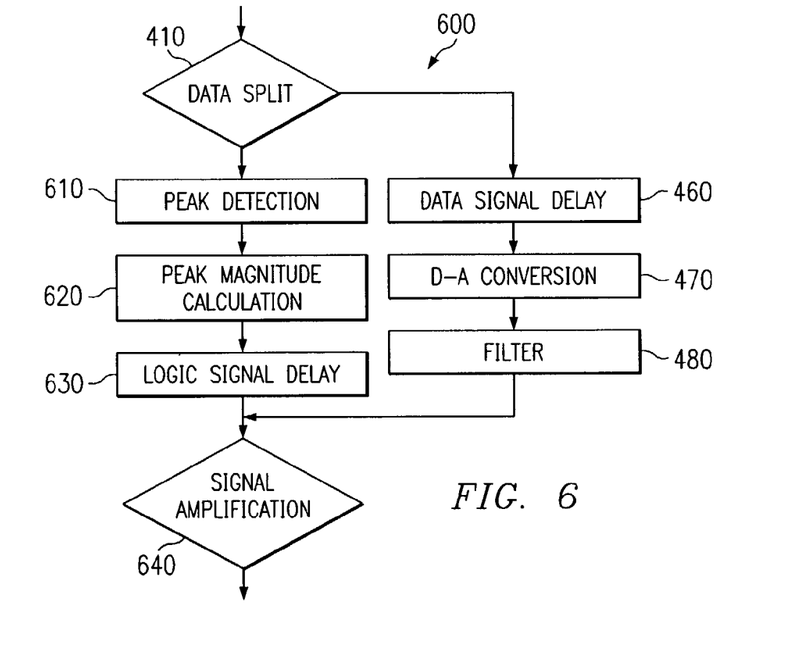
FIG. 6 illustrates a method of use of the zero-overhead Class G line driver illustrated in FIG. 5.

FIG. 6 shows a method 600 of using line driver 500 in one embodiment of the present invention. The digital input signal is first split by a signal split step 410. After the signal split step 410, the digital input signal is processed by peak detection step 610. Following peak detection step 610, a peak magnitude calculation 620 is performed, which measures the amount by which digital input signal exceeds the threshold value. A logic signal delay 630 is performed prior to signal amplification step 640.

Peak detection step 610 determines if the digital input signal exceeds the threshold level. In peak magnitude calculation step 620, the amount by which the digital input signal exceeds the threshold level is measured. In logic signal delay step 630, a time delay is determined and allowed to elapse prior to sending a logic signal to voltage source control 251 instructing voltage source control 251 to switch from voltage source Vcc_low 253 to a voltage source with a higher voltage level.

The data signal delay step 460, digital-to-analog conversion step 470, and filter step 480 have been previously described with regard to FIG. 4. In the final step of method 600, the filtered analog signal is amplified in an amplification step 640. The signal amplification will occur using the voltage level Vcc_low when the digital input signal is at or below the threshold value. When the digital input signal exceeds the threshold level, amplifier 250 will operate at a higher voltage level by switching to another voltage source, as has been described in greater detail above.

The steps or blocks of the above method and systems can be custom hardware or can be run on a general purpose or special purpose processor running software routines, or running firmware routines, or the like. For instance, many of the elements shown in the figures, such as peak predictor 365, data signal delay 320, peak detector 210, and the like, can be realized as software or firmware routines running on, e.g., a digital signal processor or a general purpose processor. In other instances, the elements might be realized as programs or routines being executed by a combination of general or special purpose processor and supporting hardware components. In still other embodiments, the various elements might be realized as custom circuits formed in a programmable integrated circuit such as ASIC, programmable logic array, or the like.

While this invention has been described with reference to illustrative embodiments, this description is not intended to be construed in a limiting sense. Various modifications and combinations of the illustrative embodiments, as well as other embodiments of the invention. For instance, the teaching could extend to two or more thresholds values. As described above, the teaching also could extend to multiple voltage sources coupled to a low voltage rail as a function of a threshold, as well as a high voltage rail. It is therefore intended that the appended claims encompass any such modifications or embodiments.

Thus, it is apparent that there has been provided, in accordance with the present invention, a programmable peak detector for use with zero-overhead Class G line drivers that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A line driver, comprising:
    a peak detector having a signal magnitude calculator and a logic delay element, the peak detector operable to receive a data signal, the peak detector operable to output a first logic signal when the data signal is below a threshold value and output a second logic signal when the data signal exceeds the threshold value, the signal magnitude calculator operable to calculate an amount by which the data signal exceeds the threshold value, the logic delay element operable to receive one of the first logic signal and second logic signal, the logic delay element operable to output one of a time-delayed first logic signal and a time-delayed second logic signal, wherein delay in the first logic signal and the second logic signal corresponds to the amount by which the data signal exceeds the threshold value.

2. The line driver of claim 1, further comprising:
a data signal delay operable to receive the data signal and output a time-delayed data signal;
a digital-to-analog converter operable to receive the time-delayed data signal and output an analog data signal;
a filter operable to receive the analog data signal and output a filtered analog signal; and
an amplifier operable to receive the filtered analog data signal and one of the time-delayed first logic signal and time-delayed second logic signal, wherein the amplifier operates at a first voltage level upon receiving the time-delayed first logic signal, and the amplifier operates at a voltage level that is increasing toward a second voltage level upon receiving the time-delayed second logic signal.

3. The line driver of claim 1, wherein the threshold value may be modified by an overhead value.

4. The line driver of claim 1, wherein the time-delayed second logic signal is delayed by a time interval so that the time-delayed second logic signal establishes a voltage level greater than a voltage level of the data signal.

5. The line driver of claim 1, further comprising a hold element operable to receive the one of the time-delayed first logic signal and time-delayed second logic signal, the hold element operable to maintain as an output one of the time-delayed first logic signal and time-delayed second logic signal.

6. The line driver of claim 1, wherein the first logic signal is associated with a first voltage level and the second logic signal is associated with a second voltage level, the threshold value being associated with a proportionality between the second voltage level and a root-mean-square value of the second voltage level.

7. The line driver of claim 1, wherein a time delay in one of the time-delayed first logic signal and the time-delayed second logic signal is zero.

8. A line driver, comprising:
an amplifier unit operable to receive a data signal;
a voltage source control unit operable to provide one of at least three different voltage levels to the amplifier in response to an amplitude of the data signal;
a peak detector having a logic delay unit, the peak detector operable to receive the data signal, the peak detector operable to output a first logic signal when the data signal is below a threshold value and one of a plurality of alternate logic signals when the data signal exceeds the threshold value, the logic delay unit operable to receive one of the first logic signal and plurality of alternate logic signals, the logic delay unit operable to output one of a time-delayed first logic signal and a plurality of time-delayed alternate logic signals, wherein delay in logic signals correspond to an amount by which the data signal exceeds the threshold value;
a data signal delay operable to receive the data signal and output a time-delayed data signal;
a digital-to-analog converter operable to receive the time-delayed data signal and output an analog data signal;
a filter operable to receive the analog data signal and output a filtered analog signal.

9. The line driver of claim 8, wherein the amplifier operates at a first voltage level upon receiving the time-delayed first logic signal, the amplifier operable to operate at one of a second and third voltage level in response to receiving one of the plurality of time-delayed alternate logic signals.

10. The line driver of claim 8, wherein the threshold value may be modified by an overhead value.

11. The line driver of claim 8, wherein the one of the first logic signal and plurality of alternate logic signals is selected so that the voltage level of the amplifier will be greater than a voltage level of the data signal.

12. The line driver of claim 8, further comprising:
a hold element operable to receive one of the time-delayed first logic signal and plurality of time-delayed alternate logic signals, the hold element operable to maintain as an output one of the time-delayed first logic signal and plurality of time-delayed alternate logic signals.

13. The line driver of claim 8, wherein the overhead value is determined empirically.

14. The line driver of claim 8, wherein a time delay in one of the time-delayed first logic signal and the plurality of time-delayed alternate logic signals is zero.

15. The line driver of claim 8, wherein the plurality of alternate logic signals comprises at least two alternate logic signals.

16. A line driver, comprising:
a peak detector having a signal magnitude calculator and a logic delay element, the peak detector operable to receive a data signal, the peak detector operable to output a first logic signal when the data signal is below a threshold value and output a second logic signal when the data signal exceeds the threshold value, the signal magnitude calculator operable to calculate an amount by which the data signal exceeds the threshold value, the logic delay element operable to receive one of the first logic signal and second logic signal, the logic delay element operable to output one of a time-delayed first logic signal and a time-delayed second logic signal, wherein delay in the first logic signal and the second logic signal corresponds to the amount by which the data signal exceeds the threshold value;
an amplifier unit operable to receive the data signal;
a voltage source control unit operable to provide one of at least three different voltage levels to the amplifier in response to one of the time-delayed first logic signal and the time-delayed second logic signal.

17. The line driver of claim 16, further comprising:
a data signal delay operable to receive the data signal and output a time-delayed data signal;
a digital-to-analog converter operable to receive the time-delayed data signal and output an analog data signal;
a filter operable to receive the analog data signal and output a filtered analog signal to the amplifier.

18. The line driver of claim 16, wherein the time-delayed second logic signals is delayed by a time interval so that the voltage level of the amplifier will be greater than a voltage level of the filtered analog data signal received by the amplifier.

19. The line driver of claim 16, further comprising:
a hold element operable to receive one of the time-delayed first logic signal and plurality of alternate time-delayed signals and maintain on an output one of the time-delayed first logic signal and the time-delayed second logic signal.

* * * * *